Patented Aug. 4, 1953

2,647,854

UNITED STATES PATENT OFFICE 2,647,854

INACTIVATION OF ENZYMES BY BARIUM PEROXIDE

Julius W. Pfannmuller, North Plainfield, N. J., and Alfons F. Noë, Staten Island, N. Y., assignors to Wallerstein Company, Inc., New York, N. Y., a corporation of New York No Drawing. Application November 25, 1949, Serial No. 129,497

5 Claims. (Cl. 195—31)

This invention relates to compositions and methods for the inactivation of enzymes and particularly to the inactivation of enzymes by the use of barium peroxide.

The application of liquefying and saccharifying enzymes to starch and starch suspensions is well known in the art. Starches, as a class, are used to prepare paper and textile sizes, starch coatings, laminating adhesives and the like.

For many industrial purposes, raw or thick-boiling starch in paste form is unsatisfactory because of its gel-like consistency. When suitably liquefied or thinned, the penetrating, sizing and adhesive properties are improved.

One of the simplest, safest and most economical methods for converting or thinning water suspensions of raw starch comprises the use of enzymes known as amylases. If the enzymes are not inactivated, the thinning process will continue beyond the point of optimal viscosity or body. For this reason the temperature of the batch is elevated and held at the increased temperature to thermally inactivate the enzyme and thereby prevent further liquefaction. This normally requires heating the batch to 200° F., or preferably to the boiling point, depending upon the concentration and the heat resistance of the particular enzyme.

One objection to such an operation is that the inactivation step must be initiated at a predetermined time in accordance with the equipment used so that during this final heating period the viscosity will not decrease below a chosen desired standard. Some installed equipment or the available steam pressure are not adequate to raise the temperature of the batch quickly for a rapid and complete inactivation of a more thermally resistant enzyme. In such cases the heating period must be started earlier while the viscosity is higher than desired so that the final viscosities of all batches will be uniform. This time allowance is determined by trial for each specific type of installed equipment used. In such a method a temporary interruption in the steam supply, which occasionally happens in factories, or a reduction in pressure due to other abnormal steam loads, tends to cause an extended heating period, resulting in a sub-standard viscosity.

We have found that the liquefying enzymes employed in such starch substrates can be chemically inactivated quickly and at lower temperatures by means of barium peroxide. This provides a very important method for obtaining amylaceous pastes or suspensions of uniform viscosity characteristics. It eliminates the complete reliance upon a constant and uniform supply of steam for heating and power for agitation. It also places less dependence upon the operator's judgment.

Barium peroxide is only very slightly soluble in water. Solubility increases slightly with temperature but more appreciably with the progressive decrease in pH. The anions of certain acids, notably sulfate or oxalate ions, form the less soluble barium salts. For some purposes it is preferable to use certain acids for reducing the pH of the substrate, such as hydrochloric or acetic acids, which will not precipitate the barium ion.

Barium peroxide, it should be noted, might be objectionable in certain uses because of its somewhat toxic effects towards humans. When the possible retention of undecomposed or unhydrolyzed portions of barium peroxide is objectionable in the end product, such residual material may be readily converted into barium sulfate by the addition of sulfuric acid or a soluble sulfate salt. Other known precipitants may also be used.

The method of quickly inactivating an enzyme described herein has many uses. The inactivation of starch liquefying enzymes, as has been mentioned above, is one of industrial importance. A common method for preparing starch sizes for paper is described as an example, and latitude in operating and preparing sizes, pastes or adhesives of different characteristics may be exercised without departing from the principles of this invention.

Starch and cold water are mixed and agitated until well dispersed. Twenty parts of starch to 80 parts of water will give slurry containing 20% solids. The pH should be neutral or within the pH range of 6.5 to 7.5. One pound of a concentrated commercial amylolytic type of enzyme preparation is added for every 1000 pounds of starch. Heat rapidly, using live steam if available, to 160°–165° F. If necessary, reduce the steam flow as the mass thickens. Maintain the batch temperature at 160°–165° F. If necessary, reduce the steam flow as the mass thickens. Maintain the batch temperature at 160°–165° F. and continuously heat the batch for 30 minutes. A shorter time period will produce a thicker paste, a longer time will produce a lower viscosity.

Heretofore the continuing liquefying action has been arrested by a thermal action, namely, by heating to a temperature above 200° F., preferably to the boiling point, and holding the batch at that temperature for 15 minutes. Water is then added as required for the intended use and the batch may be used hot or allowed to cool down. Rendering the batch weakly acid (pH 4 to 5.0) with alum, ammonium bifluoride, formic acid or some other acidic agent, will enable the inactivation to be effected at temperatures below the boiling point.

Instead of elevating the temperature above 165° F., the liquefying or starch modifying action may be arrested quickly and at lower temperatures with the same assurance of completely inactivating the enzyme by the method of the invention.

By way of example, the starch may be enzymatically modified, as above described for a 1000 pound batch of starch, up to and including the step wherein the batch is heated for about 30 minutes at 160°–165° F., the length of time being determined by the viscosity, and properties desired. At this point five pounds of barium peroxide is added and heating is continued for five minutes. Thereafter the batch may be held at that temperature or cooled in any manner convenient in accordance with plant practice. Under any circumstance no further enzymatic action will take place. The pH may also be adjusted to any level desired.

A practical range for the amount of barium peroxide is 0.02% to 5.0% based upon the weight of the solids in the substrate or ⅕ to 50 times the weight of the enzyme preparation. Very small amounts of the inactivator will suffice when small amounts of enzymes are used or the inactivation period can be extended above 5 minutes according to the degree of enzymatic conversion desired and the time cycle available in the production program.

The barium peroxide should preferably be added in a finely ground form to effect dispersion and provide greater surface area. Another advantageous mode of addition is to disperse the solid material in water before adding so as to avoid any possible formation of clumps. These are suggested as variations in technique rather than limitations upon the process.

In the above example it was suggested that the temperature be maintained for five minutes after adding the inactivator. This is primarily a matter of procedural preference. A minute amount of the chemical inactivator at much lower temperatures will inactivate the enzyme but will require longer time periods, during which the characteristics of the batch will continue to change until complete inactivation of the enzyme is effected. It is also possible to attain complete inactivation by using larger amounts of the chemical inactivator and heating for less than five minutes or using less inactivator and extending the heating period. These factors of amounts of inactivator and duration of heating are quite flexible and thereby permit a wide latitude in operating schedules without departing from the principle of the invention.

In cases where it is desired to add a filler such as barium sulfate to the modified starch, barium peroxide may be added in excessive amounts to inactivate the enzyme. The subsequent addition of sulfuric acid or an acid sulfate salt will form barium sulfate in situ in finely divided and dispersed form thus dispensing with a subsequent mixing step.

Chemical inactivation by means of barium peroxide is not limited to the amylolytic type of enzymes but is also applicable to other enzyme types such as proteinases, invertases and yeast enzymes.

These enzymes are used to effect specific reactions, and it is frequently desirable to check the enzymatic reaction when desired characteristics have been reached. For example, proteinases are used to hydrolyze proteins to produce hydrolysates of varying properties. According to the reaction time allowed the proteins may be denatured to various degrees of peptide or polypeptide formations or the protein may be completely broken down into the amino acids.

Protein hydrolysates are products of commerce and it has been common practice to check the reaction by thermal inactivation of the enzyme. This introduces undesirable effects as the hydrolysate must be heated to high temperatures. Darkening of the products, condensations, polymerizations, destruction of heat-sensitive materials, and development of unpalatable tastes result. By operating in accordance with this invention such high temperatures of inactivation with the attendant undesirable results are avoided.

Likewise invertase is used to invert sugar, primarily to produce non-crystaline types of sugar and sugar syrups. Heating to inactivation temperatures tends towards darkening and the development of off-tastes.

Normally yeasts are employed to ferment sugars into alcohol or for the production of organic acids or alcohols and ketones such as citric or acetic acids, butyl alcohol or acetone. Here again excessive heating may cause unexpected esterification or other side reactions to take place. Chemical inactivation affords a means to prevent changes in the relative ratios of the principal products formed.

The application and introduction of the chemical inactivator is similar with the example given above. The barium peroxide is introduced into the respective substrates when the reaction is completed and held at the reaction temperature until the enzymes are inactivated. Obviously the number of enzyme reactions are so numerous that time-temperature tables cannot be specified for each case. The principle is the same, namely, that in the presence of barium peroxide the enzymes are inactivated. While this will occur even at room temperatures or lower, inactivation will be accelerated at elevated temperatures. The higher the temperature the shorter will be the duration of time necessary to accomplish complete inactivation. Such flexibility lends itself to adaptation to existing processing cycles.

We claim:

1. A method of inactivating an amylolytic enzyme which comprises adding barium peroxide to an amylolytic enzyme-containing substrate in an amount of at least 0.02% by weight of the solids in the mixture.

2. A method of inactivating an amylolytic enzyme which comprises adding barium peroxide to an amylolytic enzyme-containing substrate in an amount of at least 0.02% by weight of the solids in the mixture, and thereafter adding a water soluble compound containing a sulfate ion in amount at least stoichiometrically equivalent to the amount of barium added.

3. In the treatment of starch with amylolytic enzymes the improvement which comprises terminating the amylolytic action by adding barium peroxide to the reaction mixture in an amount of at least 0.02% by weight of the solids in the mixture.

4. In the treatment of starch with amylolytic enzymes the improvement which comprises terminating the amylolytic action by adding to the reaction mixture a composition comprising barium peroxide in an amount of at least 0.02% by weight of the solids in the mixture.

5. In the treatment of starch with amylolytic enzymes the improvement which comprises terminating the amylolytic action by adding barium peroxide to the reaction mixture in an amount of at least 0.02% by weight of the solids in the mixture and thereafter adding a water-soluble compound containing a sulfate ion in an amount at least stoichiometrically equivalent to the amount of barium added.

JULIUS W. PFANNMULLER.
ALFONS F. NOË.

References Cited in the file of this patent

UNITED STATES PATENTS

| Number | Name | Date |
|---|---|---|
| 1,866,412 | Lee | July 5, 1932 |
| 2,302,310 | Glarum | Nov. 17, 1942 |
| 2,380,848 | Kerr | July 31, 1945 |

OTHER REFERENCES

Euler-Pope, General Chemistry of the Enzymes, John Wiley 1st Edition, 1912, page 110, Book 516.

Voge, The Manufacturing Chemist, June 1938, pages 189–191 and 184.

Sumner and Myrback, The Enzymes, vol. I, Part I, Academic Press, New York, Dec. 1950, page 318.